United States Patent Office 3,510,391
Patented May 5, 1970

3,510,391
PERLITE BOARD BONDED TO ORGANIC PLASTIC FOAM
Lyle R. Bolster, La Canada, Harland E. Tarbell, Torrance, and Donald W. Mogg, Redondo Beach, Calif., assignors to Grefco, Inc., Philadelphia, Pa., a corporation of Delaware
No Drawing. Filed May 15, 1967, Ser. No. 638,629
Int. Cl. B32b 3/26, 5/18
U.S. Cl. 161—160         10 Claims

ABSTRACT OF THE DISCLOSURE

A composite thermal insulation board having a U value of 0.2 or less and combining good mechanical properties with excellent flame resistance, has been made by covering at least one surface of a rigid, organic plastic foam layer having a thermal conductivity (K factor) of 0.4 or less and a thickness preferably within the range of ½ to 2 inches, with a perlite board having the following characteristics: K factor, 0.4 or less; thickness, preferably ¾ to 1 inch; perlite content, preferably 50 to 90% by weight; and organic phase content, preferably not more than 30% by weight. The other surface of the organic foam may be covered by any conventional facing as well as by perlite board, or it may remain uncovered.

THE PRIOR ART

Rigid plastic foam boards are unusually good thermal insulators and have thus found wide and varied use in industry. Urethane foam board, in particular, exhibits unusually low thermal conductivity and is for that reason the preferred plastic foam material of the building industry. It has a very low K factor, the K factor being the conventional coefficient of thermal conductivity expressed in B.t.u. inch/hour.square foot.° F. These boards, however, have serious drawbacks for use in building construction. For instance, all ordinary grades of urethane foam board and practicaly all self-extinguishing grades are unable to exhibit sufficiently low flammability in standard fire tests to qualify for use in the more incombustible types of steel deck roof construction, such as Underwriters' Laboratories construction Nos. 1 and 2 and Factory Mutual Class 1 construction. A new type of urethane foam has recently been placed on the market which has a sufficiently low flame spread rating in the ASTM E84 tunnel fire test so that from a flame spread point of view it is suitable for some of the more incombustible types of construction. This expensive product, with which the present invention is not concerned, has the disadvantage of giving off large amounts of smoke when exposed to fire, as in the tunnel test. Furthermore, urethane board undergoes significant thermal degradation and softening when exposed to even moderately elevated temperatures, such as those obtained at the surface of roof insulation board when the board is mopped with molten bitumen. If one also considers the very poor resistance of urethane board to abrasion and other types of physical abuse, it will be readily seen why the use of urethane board is undesirable for roof insulation even in cases where the combustibility and the smoke generating properties of the urethane might be tolerated.

Perlite insulation board constitutes another type of board much used in construction. Perlite board resists heat well, passes the standard flame spread tests and behaves better than urethane board when mopped with molten bitumen, especially if it has been given a surface coating or a surface treatment such as the Sealskin® treatment. However, its heat conductivity or K factor is approximately three times as high as that of properly manufactured urethane board. For applications requiring unusually good roof and wall insulation, total perlite board thickness of at least three or four inches would be necessary to attain satisfactorily low conductance. This conductance or U value, as it is known in the trade, is roughly speaking the conductivity of the whole insulating assembly expressed in B.t.u./hour.° F.ft.². The excessive thickness of perlite board that its higher conductivity requires causes building design and construction problems which have generally resulted in the exclusion of perlite board from such applications. In other words, the use of conventional perlite board is generally limited to buildings in which a moderate amount of insulating value is required.

The excellent insulative properties of urethane foam have of course encouraged the development of several aproaches to the combustibility and susceptibility to physical damage problems that have just been pointed out. Sandwich constructions, for instance, are commonly produced having a foamed urethane or other foamed plastic core between dense, incombustible materials such as asbestos cement board, porcelained or enameled steel, aluminum, tempered glass and so on. Thin protective skins of thermoset polyester resins containing, for instance, an adduct of a hexahalocyclopentadiene, have been used to increase both the fire resistance and the physical strength of the cores. Even combustible materials such as plywood have been used to encase urethane and other organic foams. In this respect, it is interesting to note that plastic foams are considered unsuitable for use in roof deck insulation when a steel deck is employed; fiberboard has been suggested as a barrier between the deck and the foam in such a case. The last type of sandwich that shall be mentioned is that made of urethane foam and glass fiber board, a low density inorganic insulating structure.

OBJECTS

It is an object of this invention to provide an insulating structure which overcomes the mechanical and physical disadvantages of plastic foam boards. Another object is to provide a combustion resistant structure based on urethane foam. Still another object is to provide an insulating structure of sufficiently low heat conductance so that it can find application in conventional roof building systems, even when an unusually low U value is required.

SUMMARY OF THE INVENTION

These and other objects which shall become evident upon description of this invention, have been accomplished by producing an insulation board in the form of a sandwich with a foamed plastic core, and with one or both of the outer layers of the sandwich consisting of nonplastic perlite insulation board. It has been found that particularly desirable boards can be made with foamed-in-place urethane as the core and Permalite® or other perlite board for one or both of the outer layers. The new sandwich construction not only overcomes the physical and chemical disadvantage of organic plastic foam boards, especially those of urethane foam, but does so while achieving low conductance or U values with much less thickness than perlite board would require, thus rendering the sandwich product usable in applications where the use of neither component is presently desirable.

The sandwich or composite board of this invention has a thermal conductance or U value equal to or smaller than about 0.2. At least one of the surfaces of its foam element is covered with a perlite board having a minimum thickness of 0.6 inch and a conductivity or K factor of less than 0.45. The other foam surface may be covered with any other protective or insulative material or it may remain uncovered, depending on the application requirements.

®—Registered trademark.

In the case of urethane foam-perlite board composite structure, it has been found preferable, especially for roof deck application, that the composite insulating structure consist of a perlite board layer about ¾ to 1 inch thick and a rigid foam layer ½ to 2 inches thick. Greater thickness of both materials may be employed of course when excessive thickness does not cause structural problems. In such cases, the benefits conferred by the combination disclosed here certainly remain available.

The perlite board that can be used to produce the insulating structures of this invention is a rigid composition substantially made from expanded perlite mineral, fibers, binders and water-proofing agents, used in proportions that are well known in the art. These components can be mixed by a wet process, as already disclosed in several patents such as U.S. 2,634,207, 3,042,578 and others, or by a dry process, as described in application S.N. 557,857, filed on May 26, 1966 and now U.S. Patent 3,344,217. Some additional positive requirements of usable perlite board other than the physical limitations already specified, i.e., a K factor of less than 0.45 and a thickness of at least 0.6 inch, are a minimum perlite content of at least 30% and a combustible organic phase of not more than about 35% by weight, said organic phase usually comprising cellulosic fibers and compusible sizing such as asphalt. The preferred expanded perlite content of the board has been found to be within the range of about 50 to 90% by weight. All other necessary characteristics of usable perlite boards have been described in the art.

The rigid plastic foam component of the composite board of this invention can consist of any thermosetting or thermoplastic foamed synthetic material having a thermal conductivity of not more than 0.4. This includes the preferred and most commonly used materials such as polyurethane and polystyrene foams, as well as other known organic foams having the proper conductivity limits, such as epoxy and poly(vinyl chloride) foams. These materials as well as many processes for their preparation are well known to those skilled in the art as evidenced by the article on "Foamed Plastics" in the second edition (1966) of Kirk-Othmer's Encyclopedia of Chemical Technology (volume 9, pages 847–884) and in the Handbook of Foamed Plastics edited by Rene J. Bender and published by Lake Publishing Corporation, Libertyville, Ill. (1965). A few specific foam preparations are provided in the examples to illustrate this art. Beyond this, suffice it to say that foamed plastics are formed most often by heating expandable formulations which contain a blowing agent, i.e., a liquid or solid which upon heating is capable of forming a gas either chemically or physically. Among these agents are pentanes, hexanes, halocarbons, azodicarbonamide, dinitrosopentamethylene tetramines and so on. These agents are generally added to the plastic composition before foamnig but in some cases, as with polystyrene, they may be incorporated in the plastic during polymerization. Polystyrene and poly-vinyl chloride foams are produced by a physical stabilization process while polyurethane and epoxy resins, which must undergo chemical crosslinking reactions as they assume their final shape, are said to undergo a chemical stabilization process.

The manufacture of polyurethane foams, or urethane foams for short, is based principally on the urethane reaction and the urea reaction. In the former, a hydroxyl group adds onto an isocyanate group to form a urethane bond. The heat liberated in the process is used to expand the blowing agent and thus cause the plastic mass to foam. The urea reaction, on the other hand, involves the condensation of the isocyanate group with water to liberate carbon dioxide and yield a primary amine. This amine then adds onto another isocyanate group to form a substituted urea. This reaction occurs of course when water is present in the formulation and, in such a case, it competes with the urethane reaction. Obviously, the isocyanates and alcohols employed must be at least difunctional in order to obtain polymers and a certain amount of higher functionality is needed to achieve crosslinking and the desired degree of rigidity. The ingredients may be mixed all at once or some prepolymerization may be done before the foaming process is undertaken.

As to ingredients, the usable list includes polyols, hydroxyl-terminated polyesters, polyether polyols, hydroxyamines, diisocyanates, polymeric isocyanates, catalysts, surface active agents and blowing agents. Preferred substances from these classes are: polyols having an equivalent weight of 80 to 180 and a functionality of six or higher; hydroxyl terminated polyesters having an equivalent weight of about 125 and a hydroxyl number of about 500; propylene oxide adducts of polyols such as sorbitol; amine-based polyols such as N,N,N',N'-tetrakis (2 - hydroxypropyl)ethylenediamine; toluene diisocyanates; polyarylpolyisocyanates such as polymethylenepolyphenylisocyanate; tertiary amine catalysts, e.g., triethylamine; surfactant copolymers based on dimethyl polysiloxane and polyoxysiloxanes; and halocarbon blowing agents, especially fluorocarbons. Some flame resistance may be imparted to the foams by using phosphorus or chlorine substituted polyols. Finally, various additives may be incorporated for a number of reasons. Included in this category are dyes, fibers and fillers such as wood-flour, clay, talc, antimony oxide, ammonium phosphate and so on.

The polyurethane foam can be formed and stabilized in situ on the perlite board; in this case, it serves as its own adhesive and no other bonding substance is needed. Alternately, as is the case with other usable plastic foams, ready made board of polyurethane foam can be employed, necessitating recourse to an extraneous adhesive to bond the foam board to the perlite board and to the other facing material that may be used. Any conventional adhesive suitable for the surfaces involved can be used for this purpose, asphalt emulsions and phenol-aldehyde adhesives such as phenol-resorcinol-formaldehyde being typical of such well known materials.

The following examples will serve to illustrate the invention and the improved properties thereof. They are not to be construed as limitations other than those set by the appended claims. All parts and percentages used in said examples are on a weight basis unless otherwise noted.

EXAMPLE 1

A composite board was formed by foaming and stabilizing a 1″ layer of polyurethane on a 1″ perlite board.

The perlite board consisted of 70 parts perlite, 24 parts pulped newsprint, 5 parts asphalt and 1 part Wyoming bentonite. The organic content was thus 29%. The board was made by a wet process, as taught in U.S. Pat. 2,634,207, which substantially involves preparing a slurry of perlite, fiber, water and asphalt emulsion, forming the mixture into a sheet or web, and drying it.

The polyurethane foam was formed according to a Jefferson Chemical Company recipe by mixing foam component A with foam component B in a Martin-Sweets foaming unit to give a polyurethane layer having a density of 2 lbs. per cubic foot and a K factor of 0.12. Component A consisted of 100 parts of a propylene oxide adduct of sorbitol having a hydroxyl number of about 490 and a 75° F. viscosity of about 10,000 centipoises, which is available commercially as Thanol® RS–700 (Jefferson Chemical Company, Inc.). Component B was a mixture of the following ingredients: 56 parts Thanol® RS–500 (Jefferson Chemical Company, Inc.), another propylene oxide adduct of sorbitol having a 75° F. viscosity of about 50,000 cps. and a hydroxyl number of about 640; 33.5 parts Freon–11® (du Pont), $CCl_3F$; 0.68 part triethylenediamine (Houdry Process and Chemical Company); 28 parts Firemaster® T23P (Michigan Chemical Corporation), 2,3-(di-bromopropyl) phosphate; and 0.9 part L–520 Silicone Oil, a copolymer of dimethylpolysiloxane and polyoxysiloxane with ethylene and propylene oxide (Union Carbide Corporation).

The resulting urethane-perlite board composite had a conductance or U value of 0.09. It passed the tunnel test and successfully withstood a gas-air burner flame test for more than 10 minutes. The tests shall now be described.

The tunnel test is a common name for the standard method of test for Surface Burning Characteristics of Building Materials. It can be found in A.S.T.M. Standards 1964, part 14, page 331, under the designation E84–61. The test measures surface flame spread. It makes use of a tunnel furnace developed by the Underwriters' Laboratories, which consists of a 25-foot-long tunnel having an inside width of 17½" and an inside depth of 12" measured from the bottom of the tunnel to the bottom surface of the specimen. The specimen measuring 20" x 25' constitutes the roof of the tunnel. The apparatus is fired from one end by gas burners and a flame is encouraged by controlled draft to spread along the underside of the specimen. The time rate of flame travel determines the "flame spread rating." Red oak flooring is rated as 100 and cement-asbestos board at 0. All other materials are rated by comparison. A specimen is considered by fire protection authorities to pass this test when it obtains a rating of 25 or under on this scale.

The 25-foot specimen is usually made up of several shorter lengths of the material being tested. In the present tests, it was made up of boards 20" wide and approximately 4 feet long. The composite boards were placed perlite board face down, and were simply butted against each other. Nothing was done to cover or protect the joints.

The gas-air burner flame test devised to compare the flame resistance of various composite boards is relatively easy to carry out but it subjects the boards to far more drastic conditions than those attending the tunnel test. It is done as follows: A 12" x 12" piece of composite board is placed on a ringstand, perlite board face down, and the vertex of the flame of a Benz-O-Matic propane torch, or Fisher Blast gas-air burner 3-910-5, is centered ½" below the insulation board. The air and gas feeds are adjusted to yield maximum heat output. This subjects the test surface to a very hot blue flame. The time is recorded from the moment the flame is positioned until the plastic foam is degraded by the heat or until a 10-minute period has passed. An assembly which resists the conditions of this test for a minimum period of 5 minutes is considered acceptable.

The thermal conductance of the composite boards of this invention is calculated, as mentioned earlier, from the conductivity of the component boards as determined by the Guarded Hot Plate test C–177–63, A.S.T.M. Standards 1964, part 14, page 15. Briefly, the technique consists in measuring the electrical energy required to maintain a central "hot plate" at a selected temperature. Test specimens cover each of the two hot-plate surfaces and in turn are covered by "cold" plates which are maintained at a prescribed temperature. A guard ring around the four edges of the hot plate is controlled at hot plate temperature to prevent edge heat loss. All heat energy is thus transmitted from hot plate to cold plate through the specimens. The amount of heat transmitted is determined by the insulating effectiveness of the specimens and is measured by recording power input to the hot plate heaters. A low K factor indicates superior insulating ability. It is calculated by the formula: $K = qx/A\,T$, wherein K is in B.t.u. in./hr. ° F. ft.²; $q$ is B.t.u./hr.; $x$ is specimen thickness in inches; A is specimen area in square feet, and $\Delta T$ is temperature drop through specimen in ° F.

EXAMPLE 2

A composite board for roofing application was formed by foaming and stabilizing a 1" layer of high density polyurethane on a 1" perlite board. The polyurethane surface was covered by 15-lb. roofing felt while still adhesive. The polyurethane layer had a density of 3.2 lbs. per cubic foot and a K factor of 0.17. The resulting composite board had a U value of 0.12, and was found acceptable by both the tunnel test and the gas-air flame test.

The perlite board used here was that of Example 1. The polyurethane foam, on the other hand, was prepared substantially in the manner of Example 1 but with the following ingredients. Component A consisted of 120 parts of a polymeric isocyanate, PAPI, which stands for polymethylenepolyphenyl isocyanate. Component B consisted of: 100 parts of Polyol 358, a Wyandotte Chemicals Corporation product containing significant amount of combined phosphorus for enhanced fire resistance; 1.43 parts tetramethylbutanediamine; 2.0 parts silicone oil DC–113 (Dow-Corning Corporation), which unlike the L-520 does not contain Si-O-C linkages; and refrigerant 113 ($CCl_2F-CClF_2$). Both the diamine and the refrigerant are Union Carbide Corporation products.

EXAMPLE 3

A composite board fashioned essentially in the manner of Example 1 from ¾" dry process perlite board, 1" low density polyurethane foam (2.0 lbs./cubic foot) and 5-mil Kraft paper. The foam had a K value of 0.115 and the perlite board, 0.38.

The resulting assembly had a U value of 0.095. It passed the tunnel test, although slight swelling of the foam was observed after the minimum 10 minutes exposure required, and it lasted 7 minutes in the gas-air flame test before significant deterioration took place.

The dry process perlite board contained 47 parts perlite, 20 parts newsprint fiber, 7 parts asphalt and 26 parts Wyoming bentonite. These ingredients, slightly moistened, were mixed by air turbulence, formed into a board and dried, as taught in S.N. 557,857, filed May 26, 1966.

EXAMPLE 4

A composite board was made by bonding together 2" commercial polyvinyl chloride foam slab and a 1" dry process perlite board with a phenol-resorcinol-formaldehyde adhesive, Koppers Tar and Chemical Company Penacolite® 4422. The K factor of the foam was 0.20 while that of the perlite board was 0.40.

The composite board had a U value of 0.08 and was found acceptable, as tested by the tunnel and the gas-air flame methods.

The dry process perlite board contained 47 parts perlite, 26 parts newsprint fiber, 1 part waterproofing silicone (Dow -Corning's 772) and 26 parts Wyoming bentonite. These ingredients, slightly moistened, were mixed by air turbulence, formed into a board and dried in the manner of Example 3.

EXAMPLE 5

A composite board was made with 1" Styrofoam® polystyrene foam (Dow Chemical Company) and 1" dry process perlite board bonded with an asphalt emulsion adhesive. The polystyrene component had a K value of 0.26 and the perlite board, 0.38. The perlite board was that used in Example 3.

Another composite board was made in the same manner, except that the perlite board was replaced by a 1" glass fiber roof insulation board.

On testing these two composite boards by the gas-air flame method, it was observed that the glass fiber-polystyrene structure was completely burned through (insulation and foam) in 1 minute and 58 seconds while the perlite board assembly successfully resisted the test conditions. After 10 minutes while the perlite board was charred on the bottom as usual, only ¼" of the foam had melted.

EXAMPLE 6

A composite board made of a 1" layer of fiberboard, i.e., a commercially available cellulosic fiber material product, and a 1" low density polyurethane foam board did not withstand successfully the gas-air flame test. The fiberboard burst into flame immediately upon exposure and was burnt through in less than 3 minutes, thus affording little protection to the organic foam board.

It stands therefore demonstrated by the results of the foregoing examples that perlite boards are peculiarly successful in composite structures with thermosetting and thermoplastic rigid organic foams. It is equally evident that other materials which have been suggested in this type of application or which might be considered equivalent, have failed to achieve satisfactory performance.

Although this invention has been illustrated by giving specific details of certain species embraced within its scope, it is understood that various modifications within its spirit and scope are possible that will also produce composite structures of controlled dimensions which require no further fabricating after the foaming process and which possess superior flame resistance, minimum bulk and maximum insulative capacity.

What is claimed is:

1. A composite board having a U value of not more than 0.2, which comprises
    (a) a rigid organic plastic foam layer having a K factor not greater than about 0.4, covered on at least one of its surfaces by
    (b) a perlite board having a minimum thickness of 0.6 inch, a K factor not greater than 0.45, a minimum perlite content of at least about 30% by weight and a combustible fiber and sizing content of not more than about 35% by weight, said layer being adhered to said board.

2. The board of claim 1 wherein the other surface of the foam layer is covered by a material selected from the group consisting of perlite board, roofing felt and paper.

3. The board of claim 1 wherein the rigid foam material is selected from the thermosetting and thermoplastic materials within the class consisting of polyvinyl chloride, polyurethane, polystyrene and epoxy resins.

4. The board of claim 1 wherein the rigid foam layer has a thickness within the range of ½ to 2 inches.

5. The board of claim 1 wherein the perlite board has a perlite content of 50 to 90% by weight.

6. The board of claim 5 wherein the thickness of the perlite board is within the range of ¾ to 1 inch.

7. A composite structure in the form of a sandwich consisting of
    (a) a ¾ to 1 inch thick base layer of perlite board having a perlite content of about 50 to 90% by weight and a combustible fiber and sizing content of not more than about 30% by weight;
    (b) a rigid polyurethane foam layer of ½ to 2 inches having a density of about 1.5 to 3.5 pounds per cubic foot, and
    (c) a top layer selected from the class consisting of perlite board, roofing felt and paper, said base layer and said board layer being adhered to said foam layer.

8. The composite structure of claim 7 wherein the combustible fiber and sizing phase of the base layer perlite board consists of shredded newsprint and asphalt.

9. The composite structure of claim 7 wherein the base layer perlite board contains clay.

10. The composite structure of claim 7 wherein the rigid foam layer is foamed in place.

No references cited.

WILLIAM J. VAN BALEN, Primary Examiner

U.S. Cl. X.R.

161—161, 165, 403